(12) United States Patent
Gouch

(10) Patent No.: US 9,835,837 B2
(45) Date of Patent: Dec. 5, 2017

(54) METHOD AND APPARATUS FOR ESTIMATING AN IN-FOCUS POSITION

(71) Applicant: FFEI LIMITED, Hemel Hempstead, Hertfordshire (GB)

(72) Inventor: Martin Philip Gouch, Hemel Hempstead (GB)

(73) Assignee: FFEI Limited, Hemel Hempstead (GB)

( * ) Notice: Subject to any disclaimer, the term of this patent is extended or adjusted under 35 U.S.C. 154(b) by 16 days.

(21) Appl. No.: 14/570,597

(22) Filed: Dec. 15, 2014

(65) Prior Publication Data

US 2015/0168701 A1    Jun. 18, 2015

(30) Foreign Application Priority Data

Dec. 16, 2013 (GB) .................................. 1322188.2

(51) Int. Cl.
*G02B 7/38* (2006.01)
*G02B 21/00* (2006.01)
*G02B 21/36* (2006.01)

(52) U.S. Cl.
CPC ............. *G02B 21/006* (2013.01); *G02B 7/38* (2013.01); *G02B 21/367* (2013.01)

(58) Field of Classification Search
CPC ...... G02B 21/006; G02B 21/00; G02B 21/24; G02B 21/241; G02B 21/244; G02B 21/248; G02B 21/36; G02B 21/265; G02B 7/32; G02B 7/38; G02B 7/28; G02B 26/101; G02B 21/367; H04N 7/18; H04N 5/23212; G06T 7/0012; G06T 2201/0051;

(Continued)

(56) References Cited

U.S. PATENT DOCUMENTS 5,427,910 A * 6/1995 Kamentsky .......... C12Q 1/6841
435/6.12
2004/0223632 A1  11/2004 Olszak
(Continued)

FOREIGN PATENT DOCUMENTS

EP    1 610 166 A1   12/2005
EP    2 110 696 A1   10/2009

OTHER PUBLICATIONS

British Search Report of British Application No. GB1322188.2, dated May 27, 2014.

*Primary Examiner* — Jie Lei
(74) *Attorney, Agent, or Firm* — Sughrue Mion, PLLC

(57) ABSTRACT

A method for estimating an in-focus position of a target using an image scanning apparatus is provided. The in-focus position is monitored at a seed location and an end location on the target and a pre-scan path is calculated between these locations. A pre-scan is then performed and a focus parameter is monitored for a plurality of locations along the pre-scan path. An imaging scan is next performed wherein the target is imaged along an image scan path and a focus parameter is monitored for a plurality of locations along said path. The focal height of the apparatus is adjusted during the imaging scan by comparing the focal parameter monitored for a current location on the image scan path with the focal parameter monitored for a similar location on the pre-scan path. The focal parameter monitored for different locations on the image scan path may also be compared.

18 Claims, 4 Drawing Sheets

(58) Field of Classification Search
CPC . G06T 2207/10116; G06T 2207/30024; B07C 5/10; G01N 21/8806
USPC .......... 359/381–383, 202.1, 368; 250/201.2, 250/201.3, 201.4, 201.6; 348/79, 92, 94, 348/95, 345, 349, 353; 382/100, 128, 382/131–133
See application file for complete search history.

(56) References Cited

U.S. PATENT DOCUMENTS

| | | | |
|---|---|---|---|
| 2004/0256538 A1* | 12/2004 | Olson | G02B 21/002 250/201.3 |
| 2006/0238847 A1* | 10/2006 | Gouch | G02B 7/38 359/202.1 |
| 2013/0284924 A1 | 10/2013 | Mizuochi et al. | |

* cited by examiner

METHOD AND APPARATUS FOR ESTIMATING AN IN-FOCUS POSITION

FIELD OF THE INVENTION

The present invention relates to a method of estimating an in-focus position of a target in an image scanning apparatus, together with apparatus for performing the method.

BACKGROUND TO THE INVENTION

There are many situations where image scanning apparatus, such as a microscope, is used to obtain an image of a target. In many instances the depth of focus provided by the optical arrangement of the apparatus turns out to be less than the variation in the position of the target being scanned. This can be thought of as the height of the surface varying at different points within a scan by an amount greater than the depth of focus of the apparatus. In order to produce an image of the target the focus needs to be adjusted during the scan.

It is known in the art to generate a "focus map" for the target through a pre-scan. The focus is typically measured for a number of sample points along the target according to the point-focus technique by varying the objective lens through a predefined set of height values and calculating the height of maximum contrast. The focal height of the target between these points is then predicted using interpolation techniques to generate a focus map which is an estimation of an underlying focal surface. The drawback of this process is that rapid changes in focus require many points to be measured during a "pre-scan" before imagery data is acquired. This is of course time-consuming and can lower the productivity of the apparatus significantly. Alternatively, if too few points are measured, interpolated regions between the points in the focal map may fail to provide an adequate estimation of the focal surface and the target will appear out of focus in these regions.

U.S. Pat. No. 7,518,652 discusses examples of methods for generating a focus map of a target through the use of a pre-scan including a point-focus technique and a ribbon-focus technique. Focus maps generated by the ribbon-focus technique have been found to lack accuracy in regions of the target that have non-uniform tissue detail. This problem is twofold. Firstly, if the points at which the ribbon passes through the tissue focus lack detail the focus merit will remain low, meaning that a peak in the focus merit value will not be produced and so an in-focus point will not be found. Secondly, in the event that there is a region of high detail near to the focus (but not at the focus), whilst there is low detail when the ribbon is at the focus, a peak in the merit value will be produced at the out of focus detailed region, leading to an incorrect focus level measurement. These factors leads to a discrepancy between in the focus measurement positions calculated at points across the surface of the target and the actual focal surface of the target.

SUMMARY OF THE INVENTION

In accordance with a first aspect of the present invention there is provided a method for estimating an in-focus position of a target using an image scanning apparatus comprising:
a) monitoring an in-focus focal position of the target at each of, a seed location upon the target and an end location upon the target, wherein the end location is different from the seed location;
b) conducting a pre-scan of the target along a pre-scan path, said pre-scan path comprising a plurality of locations on the target with respective focal positions calculated in accordance with the monitored focal positions at the seed and end locations, the pre-scan comprising monitoring a focus parameter at the plurality of locations and respective focal positions along the pre-scan path;
c) conducting an imaging scan wherein the target is imaged along an image scan path comprising the said plurality of locations on the target and wherein during the imaging scan, at the locations along the image scan path, the focus parameter is monitored and compared with the respective pre-scan focus parameter for that location, and the focal position of the apparatus is modulated according to the following conditions:
if the focus parameter comparison indicates that the pre-scan focal position was more in focus than the present image scan focal position, then adjust the scan focal position toward that of the pre-scan focal position; or
if the focus parameter comparison indicates that the present image scan focal position is more in focus than the pre-scan focal position, then compare the focus parameters for the present image scan location and the previous image scan location, and either adjust the scan focal position in the same direction as the adjustment for the previous location if the focus parameter for the present image scan location is more in focus than for the previous image scan location, or, adjust the scan focal position in the opposite direction to the adjustment for the previous location if the focus parameter for the present image scan location is less in focus than for the previous image scan location.

The present invention provides an effective method for "on-the-fly" focusing using an image scanning apparatus without the need for measuring in-focus positions across the sample in the pre-scan so as to form a focus map. Unlike previous techniques, the focal accuracy of the imaging scan is not dependent upon the number of points for which sample in-focus measurements are made, nor is it dependent upon the particular interpolation techniques used. Furthermore, the focus parameter comparison step provides the ability to correctly track the focus through material of varying detail (unlike the ribbon-focus technique, for example). Initially, at step (a) the in-focus position is measured at two distal locations on the target; a seed location near the start of the tissue and an end location near the end of the tissue. A pre-scan is then conducted along a pre-scan path between these positions and a focus parameter is calculated for locations along the path. An imaging scan is then performed wherein the target is imaged at locations along an image scan path that overlays the pre-scan path on the surface of the target, but not necessarily from the same focal height. The focus parameter is monitored and comparisons are made between the monitored focus parameter during the pre-scan and the imaging scan for that location on the sample and between parameters previously recorded during the imaging scan in order to adjust the apparatus toward the in-focus position. The term "for that location" is to be understood to include the surrounding region such that the respective pre-scan and imaging scan locations are generally overlapping or nearly overlapping, however preferably these locations are the same (even if their focal heights are not).

Preferably the focal position is calculated at each respective location during step (b) in accordance with a linear relationship between the in-focus positions at each of the seed and end locations. In other words the pre-scan path is preferably a straight line through the target between the monitored in-focus positions at each of the seed and end locations. It is advantageous to obtain focus merit values from the pre-scan for focal heights that are as close to the in-focus position of the target as possible. For the purposes of the pre-scan it is adequate to assume that the underlying focal surface (i.e. the 2 dimensional continuous surface of in-focus positions for the target) will lie approximately in a plane parallel to a straight line between the in-focus position at each of the seed and end locations. The imaging scan then provides an improvement upon this estimation in which imaging data is acquired whilst the focal surface is tracked.

During the imaging scan the focal height of the apparatus is typically adjusted in increments between each location on the sample, rather than continuously. Preferably, each adjustment in focal position is of a predetermined magnitude. This can be thought of as a step of predetermined size either in the upward or downward direction between locations on the image scan path. Preferably still, the adjustment in focal position in step (c) comprises a predetermined magnitude between 0.4 and 0.8 micrometers. Typically the focal height of a target will not vary between locations on an imaging scan by more than 0.5 micrometers (this is particularly true in the example where adjacent locations are separated from one another by approximately 20 micrometers) and so step height adjustments of this magnitude adequately track the in-focus position or focal surface without either substantially 'overshooting' the in-focus position, or reacting too gradually to a much larger change in the in-focus position.

The focus parameter may take a number of forms although preferably it takes the form of a focus merit value. Typically a focus merit value is a numerical measure of the degree of complexity within an image, wherein the greater the value the greater the detail in the image (and the higher the contrast). A more in-focus image has a corresponding higher merit value. It is particularly advantageous to use merit values during the imaging scan in the form of normalised merit values. Preferably, the focus merit value is normalised by dividing the focus merit value for the present image scan location by the respective focus merit value at substantially the same location on the target for the pre-scan so as to create a normalised focus merit value which is independent of the image content.

The method provides instructions for how to adjust the focal position of the apparatus during the imaging scan if the focus parameter comparison indicates that the pre-scan focal position was either more or less in focus than the present position. Preferably, if neither condition is met, then the scan focal position is adjusted in the same direction as the adjustment for the previous location. This will be the case, for example, if the focal height is the same at a location during the imaging scan as it was during the pre-scan.

The image acquired by the movement of the apparatus across the image scan path forms a swathe. The method finds particular use when implemented using a line scan detector or a 'line scanner'. Line scan detectors typically comprise a photodetector array in the form of a narrow strip or line of pixels. The array detector is typically configured to be incrementally moved between locations across the surface target parallel to the narrow direction of the array so as to acquire additional scan lines for and between each location. Preferably, the invention further comprises monitoring an in-focus position of the target for a further seed location on the target and repeating steps (b) and (c) for further swathes using the monitored in-focus position of the end location of step (a) and the monitored in-focus position of the further seed location. In this case the further seed location is laterally offset from the image scan path and marks the start of a new swathe. It is hence possible to repeat steps (b) and (c) for adjacent swathes (i.e. strips of the target) without measuring an in-focus position for a new end location; the slope of the first scan path can be relied upon, albeit offset if necessary for the in-focus position from a new seed location. Alternatively, the in-focus position may be monitored for a further end location on a new swathe and the in-focus position of the seed location of step (a) using the previous scan path may be relied on to calculate a further pre-scan path. It is preferable to make at least one new in-focus measurement because we have found that the focal surface varies appreciably over the surface of the target between adjacent swathes. Depending on the width of the swathe, it is not always necessary to make this new measurement however and the previous pre-scan path can be repeated for an adjacent swathe in some cases or even estimated using the results from previous swathes.

The target may take a number of forms however preferably the target comprises a biological tissue sample. The target preferably shows no substantial variation in surface height and so is essentially flat. For example, the target could be a stained tissue extract that has been sliced and retained between flat glass slides.

As discussed, the image scan path overlays the pre-scan path as viewed on the surface of the target. The focal height of the imaging path at a given location is, however, typically different from that location during the pre-scan path. Preferably the focal height of the first position on the image scan path is separated from the focal height of the pre-scan path by a predetermined distance. This predetermined distance is typically 0.4 to 0.8 micrometers. Preferably still, the first position of the image scan path occurs at the seed location on the target however at a focal height that is off-set from the monitored in-focus position by said predetermined distance. Otherwise, if the image scan path and the pre-scan path were to begin from the same focal position, the focal parameter at that location will be the same for the image scan path and the pre-scan path and the focal position of the apparatus will typically be modulated arbitrarily upward or downward for the next location otherwise it will continue to follow the pre-scan path (which may not track the focal surface).

The image scan path preferably further comprises a series of lines between each location, wherein the target is imaged at each line during the imaging scan. There are typically a set number of lines between locations, for example 85, and this may be user determined or set by a certain buffer size. Preferably there are less than 4000 lines between each location i.e. less than 4000 images are taken between each point on the sample for which a focus parameter was monitored during the pre-scan.

Typically the locations on the image scan path are distally separated from one another by a predetermined distance of 10 to 30 micrometers. This location spacing may also be thought of as the pitch of the scan. Low pitches of this order are particularly desirable for microscopes with a resolution (i.e. line width) of approximately 0.2 micrometers. It is not desirable to have the locations separated by a predetermined distance that is of the same order as the resolution (or less) as the processing becomes unnecessarily burdensome. Shorter distances between locations enable more frequent focus adjustment and improved focus tracking.

The focal position of the apparatus is typically adjusted between adjacent lines on the image scan path after the comparison of step (c) has occurred. The imaging scan will typically progress along the image scan path, acquiring image data for each line until a location on the target is reached which corresponds to a location where a focal parameter was monitored and recorded during the pre-scan. At this point the comparison of step (c) is made and the focal height of the apparatus is modulated either upward or downward accordingly. Image data may also be recorded at this location. The modulation may occur either at a location following the comparison or between a location and a subsequent line on the image scan path. The apparatus then continues to record image data as before at this focal height for each line until the next location is again reached. Alternatively, the modulation in focal height may be gradual or continuous between locations on the image scan path.

It will be appreciated that the present method can be used on virtually any scanning system and is not limited to light scanning, for example it could also be used in electron microscopes and the like. However, preferably the method is performed using a microscope that detects light, such as a fluorescent or transmissive system.

According to a second aspect of the invention there is provided an image scanning apparatus comprising: a detector array for obtaining image information from a target; a scan device for causing relative motion between the detector array and the target; and a focussing device adapted to modify the focus between the detector array and the target; the apparatus characterised by: a processor adapted to cause the apparatus to perform the method according to the first aspect.

As will be appreciated, the scanning apparatus may typically comprise a microscope or a scanner, of which various types are envisaged, including array scanners (such as line scanners) and scanners which move the target rather than the detectors array and any lenses. Suitable means for performing one or each of the scanning, calculating and estimating steps may also be provided.

BRIEF DESCRIPTION OF THE DRAWINGS

An example of a method and apparatus according to the present invention is now described with reference to the accompanying drawings, in which.

DETAILED DESCRIPTION

Figure 1:
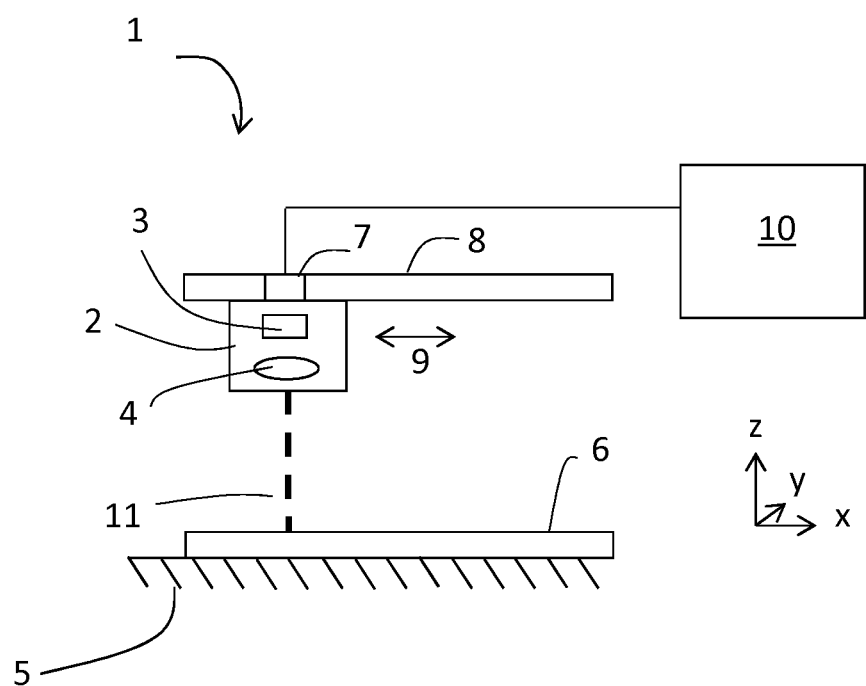
FIG. 1 is a schematic representation of apparatus according to the example.

An example image scanning apparatus 1 is shown in FIG. 1. This comprises a scan head 2, such as a line scan detector, comprising a photo-detector array 3 and an adjustable focus system 4. A platen 5 is provided upon which is positioned a target to be scanned 6. The target is typically a biological tissue sample and can be assumed to be predominantly flat. A drive mechanism 7 attaches the scan head 2 to a track 8 such that the scan head can be moved with respect to the target 6 as indicated by the arrows 9. The track 8 can also allow the scan head to be displaced laterally (parallel to the optical axis 11 of the scan head 2 and the scanning direction 9) for imaging adjacent swathes. The image scanning apparatus 1 is controlled using a controller 10 which may comprise programmable logic, a dedicated processor or a computer system.

Figure 3:
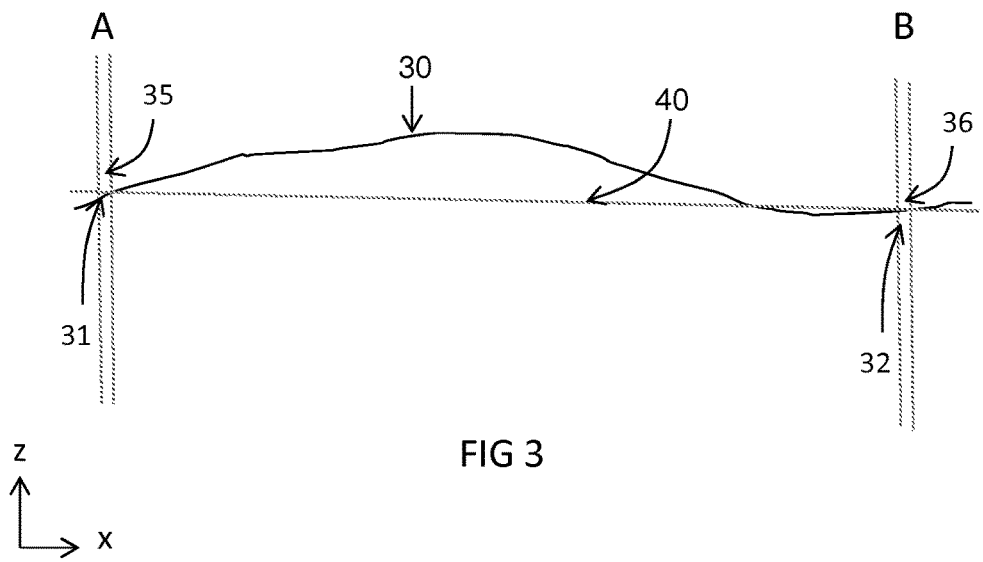
FIG. 3 is an illustration of monitoring the in-focus position of a target at a seed and end location.

Coordinate axes are also provided in FIGS. 1, 3 and 4 for reference to in the following example. The ordinate z-axis is aligned with the optical axis of the scan head 2 and the focal height of the target 6, whereas the abscissa x-axis represents the scan direction (parallel to the arrow 9 in FIG. 1). The surface of the target 6 is aligned in the xy plane.

Figure 2:
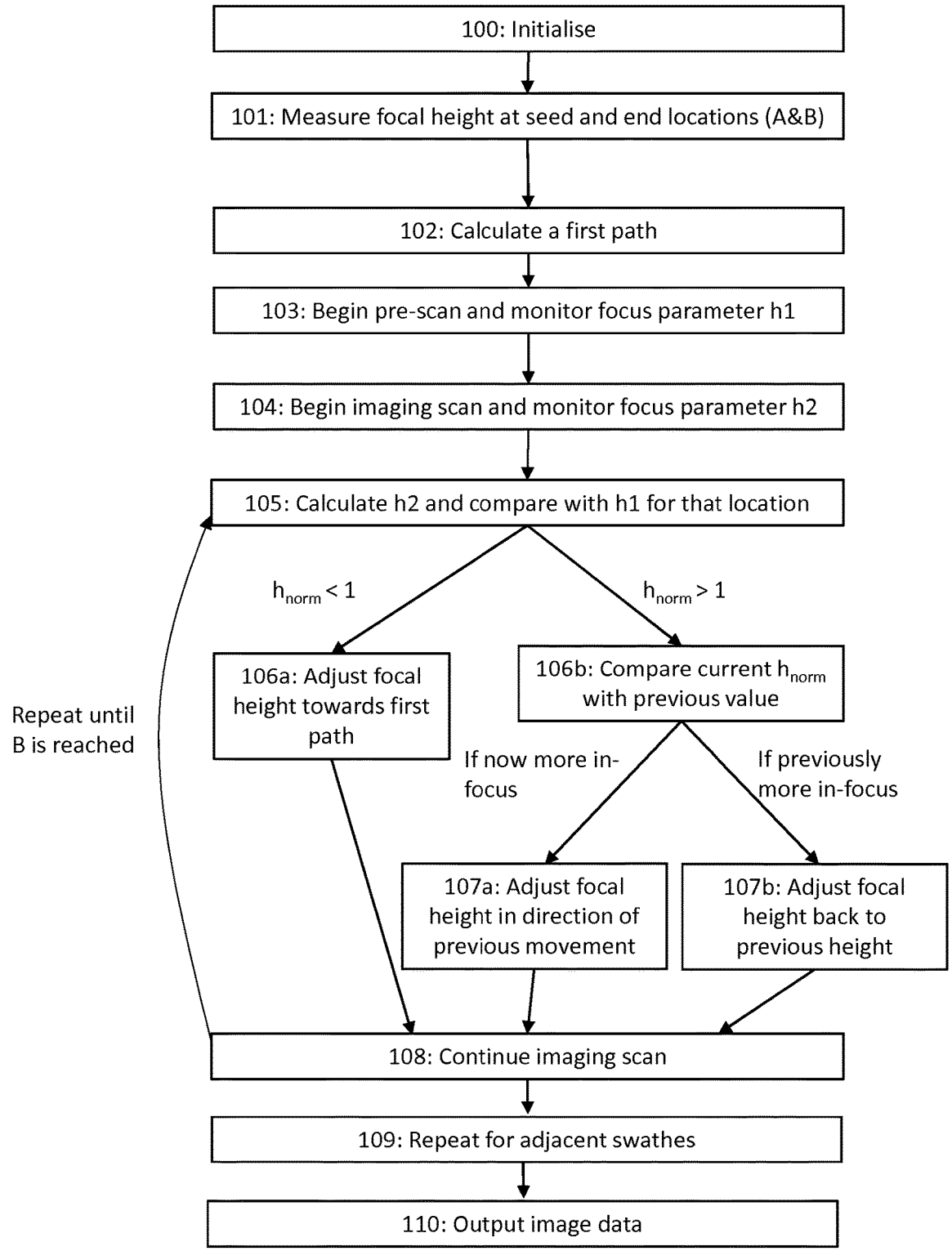
FIG. 2 is a flow diagram of the example method.

The operation of the image scanning apparatus 1 in performing an example of the method according to the invention will now be described with reference to FIGS. 2 to 4. The underlying "focal surface" or continuous in-focus position for each location on the target 6 is shown by reference numeral 30. Ideally, we wish for the focal height for positions along the imaging scan to coincide with the in-focus level shown by focal surface 30 in order to obtain the best image information.

The method begins at step 100 where various setup and initialisation procedures are performed including positioning the target 6 upon the platen 5. The controller 10 moves the scan head 2 by means of the drive mechanism 7 to a seed location A. At step 101 an initial focus measurement is made at point A. The focal height of the adjustable focus system 4 is varied through a predefined range of focal heights 35 so as to obtain image information from the target 6 at a number of different focal positions along the z-axis. An in-focus position 31 is then calculated from the image information at each focal position through use of a focus parameter. The focus parameter may take a number of forms although preferably it takes the form of a focus merit value. Typically a focus merit value is a numerical measure of the degree of complexity within an image, wherein the greater the value the greater the detail in the image. A more in-focus image has a corresponding higher merit value.

The controller 10 then moves the scan head 2 by means of the drive mechanism 7 to an end position B and the process is repeated to calculate an in-focus position 32 at location B. At step 102 the controller 10 calculates a pre-scan path 40 which is a straight line through the target 6 intersecting the monitored in-focus positions at the seed location 31 and the focal height at the end location 32.

The scan head 2 is then moved to the 'in-focus' position 31 for location A and begins a pre-scan at step 103. The scan head 2 is moved across the target 6 along the pre-scan path 40 and the focus parameter h1 is monitored at the plurality of locations with respective focal positions along the pre-scan path 40.

At step 104, the imaging scan begins with the controller 10 causing the drive mechanism 7 to move the scan head 2 along the track 8 at a predetermined velocity (either smoothly or stop-start). The scan begins at location A but from a focal height offset in the z-axis from the in-focus position 31 by a pre-determined distance of approximately 0.6 micrometers. The scan head 2 is then moved across the target 6 at the initial focal height, parallel to the pre-scan path 40 and the photo-detector array 3 repeatedly obtains scan lines of image information as the scan proceeds until the first 'buffer' is reached (for example after 85 lines). At this location the focus parameter h2 is monitored and compared by the controller 10 with the respective pre-scan focus parameter h1 for that location.

Figure 4A:
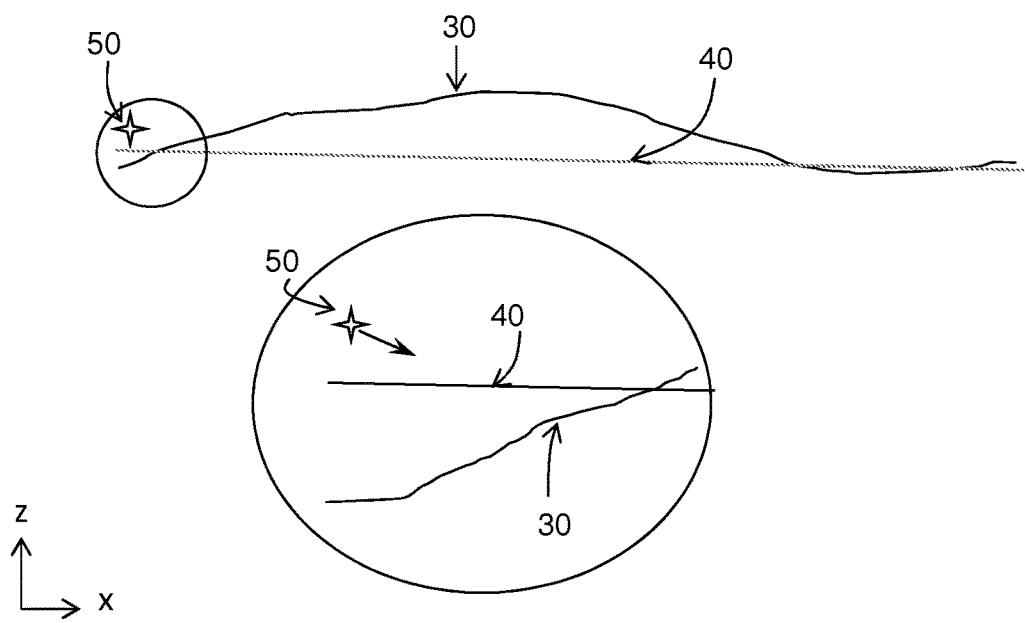
FIG. 4A is an illustration of the imaging scan if the focus parameter comparison indicates that the present image scan focal position is less in focus than the corresponding pre-scan focal position.

FIG. 4A shows the scenario in which the focus parameter comparison indicates that the pre-scan focal position was more in focus than the present image scan focal position 50 (i.e. h1>h2). It is particularly advantageous in the present invention to use merit values for the further focus levels in the form of normalised merit values. The normalisation is typically performed with respect to the focus level at substantially the same location of the target during the pre-scan. The same location of the target is used so as to prevent there being a difference in the amount of image detail present between the merit value at the further focus level and that at the nominal focus level. The assumption is therefore that the level of detail within the target is the same at adjacent locations such that these can be thought of as substantially the same location. The current focus merit value h2 is divided by the equivalent value h1 for that location during the pre-scan to obtain a normalised focus parameter $h_{norm}$. Therefore, in this scenario where h1 is greater than h2, $h_{norm}$ is less than 1. In order to optimise the focus of the image, at step 106a the controller 10 causes the adjustable focus system 4 to adjust the focus height of the current position 50 toward the pre-scan path 40 by a predetermined amount of 0.6 micrometers. This is shown by the bold downward arrow in FIG. 4A. At step 108 the imaging scan proceeds as before but at the new focal height. Image information is recorded for each line until the next buffer is reached at which point the focal parameter comparison is made again and the process is repeated. It should be noted that the scan can be temporarily slowed between the scan lines so as to allow the adjustable focus system time to adjust the focus. However this may not be essential depending on the rapidity with which the scan is performed and with which the focus may be adjusted. Typically the focal height is adjusted between a given location and the adjacent line on the image scan path, however in the event that the focal height adjustment occurs over a series of lines (for example 5) the location merit value error due to the focus movement is generally negligible.

Figure 4B:
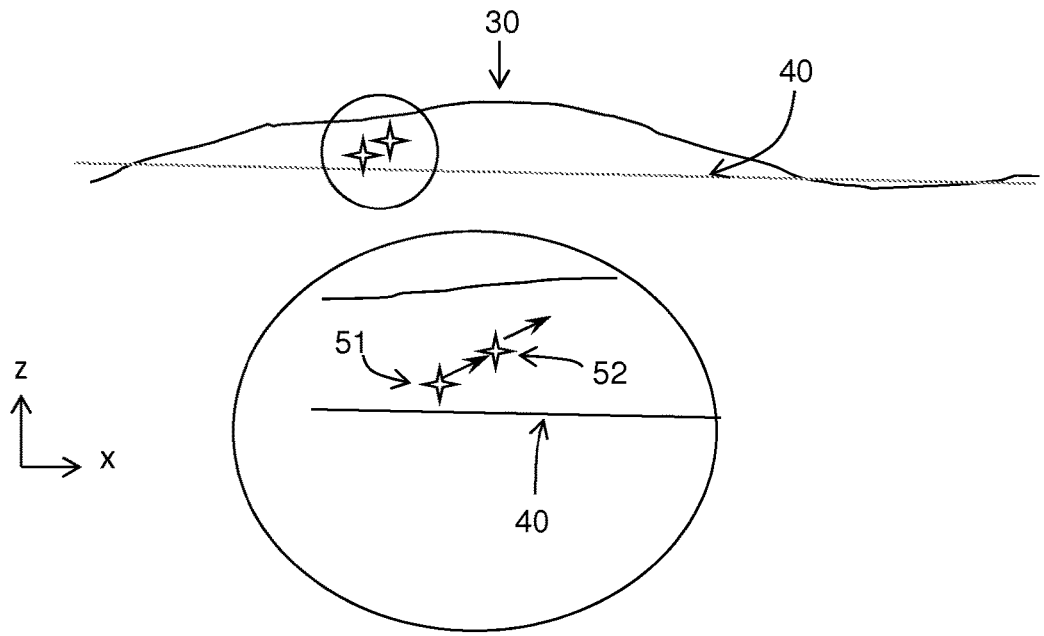
FIG. 4B is an illustration of the imaging scan if the focus parameter comparison indicates that the present image scan focal position is more in focus than the pre-scan focal position and the present image scan location is more in focus than the previous image scan location; and, FIG. 4C is an illustration of the imaging scan if the focus parameter comparison indicates that the present image scan focal position is more in focus than the pre-scan focal position and the present image scan location is less in focus than the previous image scan location.

FIG. 4B shows the scenario in which the focal parameter comparison indicates that the present image scan focal position 52 is more in focus than the pre-scan focal position ($h_{norm}$>1). At step 106b, the normalised focus parameter $h_{norm}$ for the present image scan position 54 is compared with the normalised focus parameter recorded for the last buffer (shown at 51). If the current $h_{norm}$ is larger than the previous $h_{norm}$, the present target is more in-focus at position 52 than it was at the position 51. In this case the controller 10 causes the adjustable focus system 4 to adjust the focus level in the direction of the previous focal height modulation by the same pre-determined amount (shown by the two consecutive upward arrows). This is also shown at step 107a in FIG. 2. The imaging scan then proceeds as before but at the new focal height until the next buffer is once again reached.

Figure 4C:
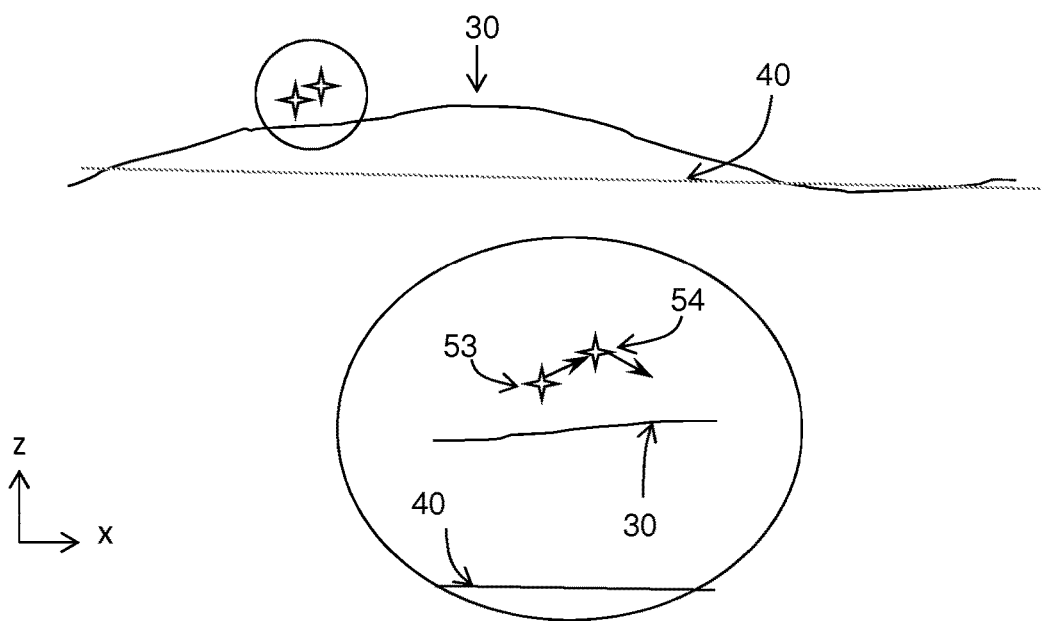

FIG. 4C shows the alternative scenario wherein the focal parameter comparison indicates that the present image scan focal position 54 is more in focus than the equivalent pre-scan focal position and the image-scan position 54 is currently less in focus than it was for the image-scan position 53 where the focus parameter was last monitored. In this case, at step 107b the controller 10 causes the adjustable focus system 4 to adjust the focus level back toward the previous focal height (shown by the upward arrow, followed by the downward arrow). The imaging scan then proceeds as before but at the new focal height until the next buffer is once again reached.

If neither condition is met, i.e. h1=h2 for a given location (for example, if the imaging scan is at the same focal height for a nominal location on the target as it was during the pre-scan), the controller 10 causes the adjustable focus system 4 to adjust the focus level in the direction of the previous focal height modulation. If this occurs for the first position in the imaging scan (for which there is no previous height modulation) the focal height is arbitrarily moved either upward or downward by a pre-determined amount. The imaging scan proceeds as before but at the new focal height until the next buffer is once again reached.

Unlike previous techniques (such as the ribbon-focus technique) if the detail content varies between subsequent measurements, this is compensated for by the normalisation step. The use of the two merit focus values combined gives the ability to correctly track the focus through material of varying detail.

The imaging scan typically continues for the length of the target 6 until location B is reached. The image lines acquired across this path define a first swathe (which correlates to an image strip of the target in the xy plane). The process is then repeated for adjacent swathes. The controller 10 adjusts the scan head 2 to make a lateral movement in the y direction perpendicular to the scan direction 9 and the optical axis of the system 1.

Optionally, the seed and end locations may once again be measured for the next swathe and a first path calculated between them. Alternatively it can be assumed that the target itself shows relatively little variation in focal height between adjacent swathes and the slope of the previously calculated first path may be once again used. A new focal height may (or may not) be made at either the seed or end location however to determine by how much to off-set this gradient (if at all). Alternatively a first path may be predicted by the controller 10 using focus data acquired from the adjacent swath (or swathes). Steps 103 to 109 are then repeated as before until the whole target 6 is imaged. Typically a swathe will be between 15 to 20 mm in width (along the y-direction) and 10 to 15 adjacent swathes will be recorded until the target is fully imaged. The image data acquired during the imaging scans is then outputted at step 110 to a computer for processing and thereafter to a display for analysis by a user.

The invention claimed is:

1. A method for estimating an in-focus position of a target using an image scanning apparatus comprising:
    a) monitoring an in-focus focal position of the target at each of, a seed location upon the target and an end location upon the target, wherein the end location is different from the seed location;
    b) conducting a pre-scan of the target along a pre-scan path, said pre-scan path comprising a plurality of locations on the target with respective focal positions calculated in accordance with the monitored in-focus focal positions at the seed and end locations, the pre-scan comprising monitoring a focus parameter at each of the plurality of locations and respective focal positions along the pre-scan path;
    c) conducting an imaging scan wherein the target is imaged along an image scan path comprising the said plurality of locations on the target and wherein during the imaging scan, at the locations along the image scan path, a focus parameter of the imaging scan at one of the locations is monitored and compared with a focus parameter of the pre-scan at the one of the locations, and a scan focal position of the apparatus is modulated according to the following conditions:
if a first condition of a focus parameter comparison indicates that the focal position of the pre-scan at the one of the locations was more in focus than the scan focal position of the imaging scan at the one of the locations, then adjust the scan focal position toward that of the focal position of the pre-scan; or
if a second condition of the focus parameter comparison indicates that the scan focal position of the imaging scan at the one of the locations is more in focus than the focal position of the pre-scan at the one of the locations, then compare a focus parameter of the imaging scan at the one of the locations with a focus parameter of the pre-scan at the one of the locations, and either adjust the scan focal position in a same direction as an adjustment for a location previous to the one of the locations if the focus parameter of the imaging scan at the one of the locations indicates a more in focus value than the focus parameter of the pre-scan at the one of the locations, or, adjust the scan focal position in an opposite direction to the adjustment for the location previous to the one of the locations if the focus parameter of the imaging scan at the one of the locations indicates a less in focus value than the focus parameter of the pre-scan at the one of the locations,
wherein b) further comprises calculating the focus parameter at each of the plurality of locations and respective focal positions along the pre-scan path as an indication of how in-focus the target is at each of the plurality of locations in comparison to the in-focus focal positions at the seed and end locations.

2. The method according to claim 1, wherein (b) comprises calculating the focal positions respective to each of the plurality of locations in accordance with a linear relationship between the in-focus focal positions at each of the seed and end locations.

3. The method according to claim 1, wherein adjustments in scan focal position in (c) are of a predetermined magnitude.

4. The method according to claim 3, wherein the predetermined magnitude of the adjustments in focal position in (c) is between 0.4 and 0.8 micrometers.

5. The method according to claim 1, wherein each of the focus parameters at the plurality of locations comprise a focus merit value.

6. The method according to claim 5, wherein the focus merit value is normalized by dividing the focus merit value for the focal position of the imaging scan at the one of the locations by the respective focus merit value for the pre-scan.

7. The method according to claim 1, further comprising, if neither is the first condition or the second condition are met, then the scan focal position of the apparatus is modulated in the same direction as an adjustment for the previous location.

8. The method according to claim 1, further comprising; monitoring a further in-focus focal position of the target for a further seed location on the target and repeating (b) and (c) for adjacent swathes using the monitored in-focus focal position of the end location of (a) and the monitored in-focus focal position of the further seed location.

9. The method according to claim 1, wherein during the imaging scan a focus position of the imagine scan at one of the locations along the image scan path is only calculated after the apparatus has monitored the focus parameter of the imaging scan at the previous location during the imaging scan.

10. The method according to claim 1, wherein the target comprises a biological tissue sample.

11. The method according to claim 1, wherein a focal height of a first position on the image scan path is separated from a focal height of the pre-scan path by a predetermined distance.

12. The method according to claim 1, wherein said image scan path further comprises a series of lines between each of the locations, wherein the target is imaged along each line during the imaging scan.

13. The method according to claim 1, wherein the scan focal position of the apparatus is adjusted between adjacent lines on the image scan path after the focus scan comparison of (c) has occurred.

14. The method according to claim 1, wherein the locations on the image scan path are distally separated from one another by a predetermined distance between 10 to 30 micrometers.

15. The method according to claim 1, wherein the image scanning apparatus is a microscope.

16. An image scanning apparatus comprising:
a detector array configured to obtain image information from a target;
a scan device configured to cause relative motion between the detector array and the target; and
a focusing device adapted to modify the focus between the detector array and the target;
the apparatus characterized by:
a processor adapted to cause the apparatus to perform the method according to claim 1.

17. The method according to claim 1, wherein at least one of the respective focal positions along the pre-scan path is less in-focus with respect to the target that the in-focus focal positions at the seed and end locations.

18. The method according to claim 1, wherein c) further comprises adjusting the scan focal positions of the imaging scan to be more in focus with respect to the target than the respective focal positions calculated in the pre-scan according to comparing the focus parameter of the imaging scan at the one of the locations with the focus parameter of the pre-scan at the one of the locations.

* * * * *